United States Patent [19]

Vishlitzky et al.

[11] Patent Number: 5,802,557
[45] Date of Patent: Sep. 1, 1998

[54] SYSTEM AND METHOD FOR CACHING INFORMATION IN A DIGITAL DATA STORAGE SUBSYSTEM

[76] Inventors: Natan Vishlitzky, Alton Ct., Brookline, Mass. 02132; Yuval Ofek, 9 DiCarlo Rd., Hopkinton, Mass. 01748; Haim Kopylovitz, 15 Naples Rd., Brookline, Mass. 02146

[21] Appl. No.: 619,931

[22] Filed: Mar. 18, 1996

[51] Int. Cl.⁶ ............................................. G06F 13/00
[52] U.S. Cl. .............................................. 711/112
[58] Field of Search ............................. 395/427, 438, 395/439, 440, 445, 481, 850, 885; 711/100, 111, 112, 113, 154

[56] References Cited

U.S. PATENT DOCUMENTS

| | | | |
|---|---|---|---|
| 3,824,563 | 7/1974 | Luiz | 395/439 |
| 4,394,732 | 7/1983 | Swenson | 395/440 |
| 4,489,378 | 12/1984 | Dixon et al. | 395/853 |
| 4,499,539 | 2/1985 | Vosacek | 395/621 |
| 4,603,380 | 7/1986 | Easton et al. | 395/440 |
| 5,206,939 | 4/1993 | Yanai et al. | 395/404 |
| 5,253,351 | 10/1993 | Yamamoto et al. | 395/445 |
| 5,313,617 | 5/1994 | Nakano et al. | 395/500 |
| 5,388,013 | 2/1995 | Nakamura | 360/48 |
| 5,394,534 | 2/1995 | Kulakowski et al. | 395/439 |
| 5,471,594 | 11/1995 | Stone | 395/885 |
| 5,530,829 | 6/1996 | Beardsley et al. | 395/440 |
| 5,535,372 | 7/1996 | Benhase et al. | 395/500 |
| 5,568,628 | 10/1996 | Satoh et al. | 395/440 |
| 5,581,743 | 12/1996 | Burton et al. | 395/500 |
| 5,649,153 | 7/1997 | McNutt et al. | 395/445 |
| 5,664,144 | 9/1997 | Yanai et al. | 711/113 |

*Primary Examiner*—Tod R. Swann
*Assistant Examiner*—Conley B. King, Jr.
*Attorney, Agent, or Firm*—Mark J. Casey, Esq.; John M. Gunther, Esq.

[57] ABSTRACT

A digital data storage subsystem stores data for use by digital data utilization device. The data as used by the digital data utilization device being organized in the form of variable-length records. The digital data storage subsystem includes a digital data storage device, a cache and a cache control. The digital data storage device has at least one fixed block storage unit for storing a predetermined amount of data, the storage unit storing at least one record and additional padding if the record does not comprise at least said predetermined amount of data. The cache including at least one cache slot which can accommodate the storage of the predetermined amount of data, that is, the amount which can be stored on the block storage unit of the digital data storage device. The cache control controls the transfer of data from the fixed block storage unit to the cache slot for use by the digital data utilization device, and in addition controls the transfer of data from the cache slot to the fixed block storage unit if the digital data utilization device modifies the data in the cache slot. The cache control controls the transfer so that the format of the data in the fixed block storage unit conforms to the format of the data in the cache slot, so that no changes are required to the formatting of the data during such a transfer.

2 Claims, 10 Drawing Sheets

SYSTEM AND METHOD FOR CACHING INFORMATION IN A DIGITAL DATA STORAGE SUBSYSTEM

FIELD OF THE INVENTION

The invention relates generally to the field of digital computer systems and more particularly to system and method for caching information in a digital data storage subsystem for facilitating transfers between a storage medium which stores data in the form of blocks, such as provided by fixed block architecture disk storage devices, and a cache memory which caches the data stored on such devices.

BACKGROUND OF THE INVENTION

In modern "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them. The users may operate on their own data, which they may maintain on the computers they are using, or alternatively they may share data through the large mass storage subsystems.

One such large mass storage subsystem is described in, for example, U.S. Pat. No. 5,206,939, entitled System And Method For Disk Mapping And Data Retrieval, issued Apr. 27, 1993 to Moshe Yanai, et al (hereinafter, "the '939 patent"), U.S. patent application Ser. No. 07/893,509 filed Jun. 4, 1992, now U.S. Pat. No. 5,381,539 in the name of Moshe Yanai, et al., entitled "System And Method For Dynamically Controlling Cache Management," and U.S. Pat. application Ser. No. 08/523,304, now U.S. patent No. 5,592,432, filed Sep. 5, 1995, in the name of Natan Vishlitzky et al. and entitled Cache Management System Using Time Stamping for Replacement Queue (Atty. Docket No. 95-032) (hereinafter referred to as the "Vishlitzky application"), all of which are assigned to the assignee of the present invention and incorporated herein by reference. That patent and those applications generally describe an arrangement which allows data, as used by computers, organized in records, with each record being in well-known "CKD" ("count-key-data") format, to be stored in storage devices which provide a "fixed block" storage architecture. In this arrangement, a large cache are used to buffer data that is transferred from the storage devices for use by the respective computers, and, if the data has been modified, transferred back from to the storage devices for storage. Problems arise, however, in organizing the caches so that information may be transferred between respective storage devices and cache in an efficient manner.

SUMMARY OF THE INVENTION

The invention provides a new and improved system and method for caching information in a digital data storage subsystem to facilitate rapid transfer to and from a storage medium such as a disk storage device.

In brief summary, the new digital data storage subsystem stores data for use by digital data utilization device. The data as used by the digital data utilization device being organized in the form of variable-length records. The digital data storage subsystem includes a digital data storage device, a cache and a cache control. The digital data storage device has at least one fixed block storage unit for storing a predetermined amount of data, the storage unit storing at least one record and additional padding if the record does not comprise at least said predetermined amount of data. The cache including at least one cache slot which can accommodate the storage of the predetermined amount of data, that is, the amount which can be stored on the block storage unit of the digital data storage device. The cache control controls the transfer of data from the fixed block storage unit to the cache slot for use by the digital data utilization device, and in addition controls the transfer of data from the cache slot to the fixed block storage unit if the digital data utilization device modifies the data in the cache slot. The cache control controls the transfer so that the format of the data in the fixed block storage unit conforms to the format of the data in the cache slot, so that no changes are required to the formatting of the data during such a transfer.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
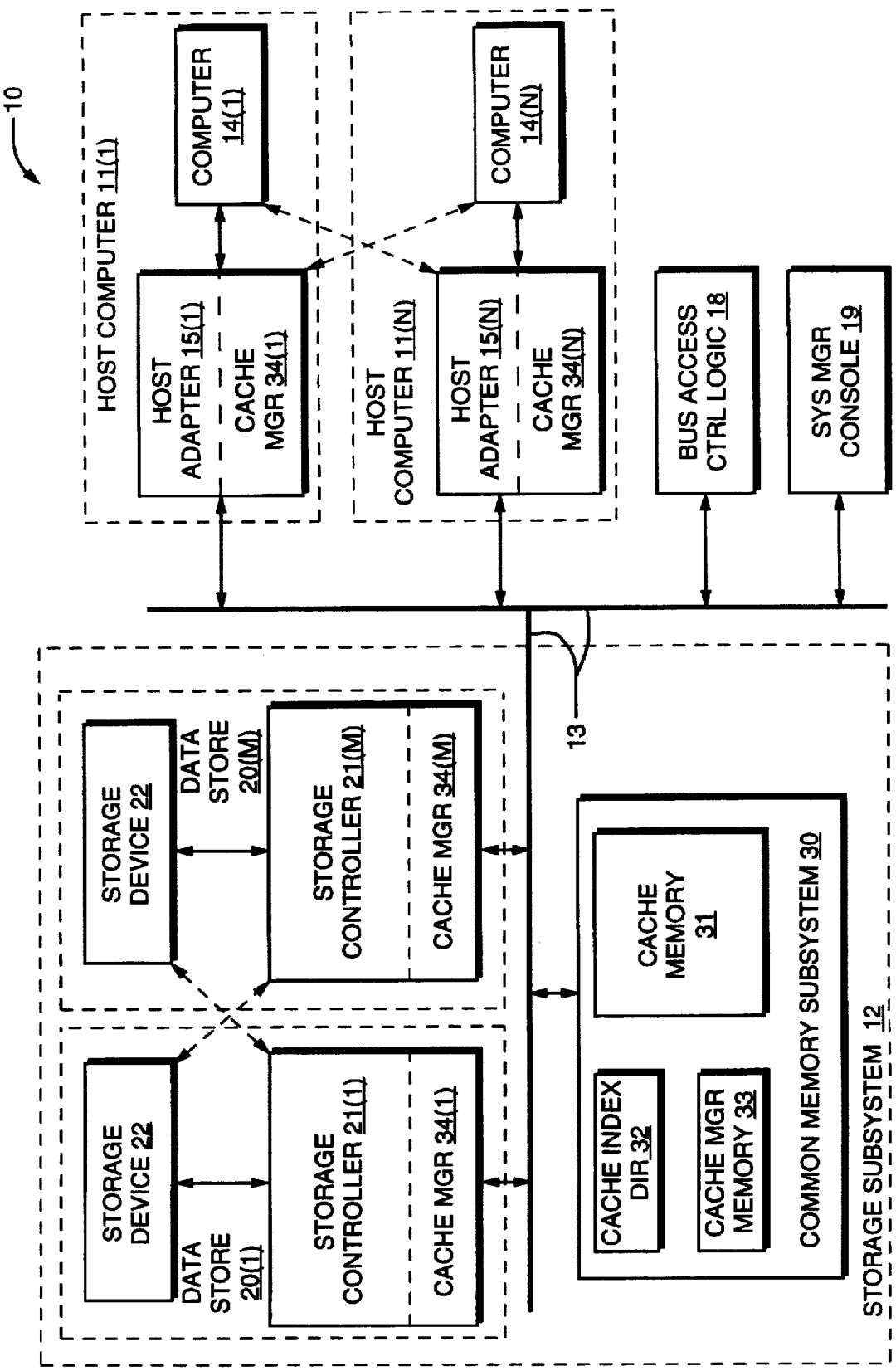
FIG. 1 is a functional block diagram of a digital computer system, including a storage subsystem constructed in accordance with the invention.

The invention will be described in connection with a digital computer system 10 depicted in functional block diagram form in FIG. 1. With reference to FIG. 1, computer system 10 includes a plurality of host computers 11(1) through 11(N) (generally identified by reference numeral 11(n)) and a digital data storage subsystem 12 interconnected by a common bus 13. Each host computer 11(n) includes a local computer 14(n), which may comprise, for example, a personal computer, workstation, or the like which may be used by a single operator, or a multi-user computer system which may be used by a number of operators. Each local computer 14(n) is connected to an associated host adapter 15(n), which, in turn, is connected to bus 13. Each local computer 14(n) may control its associated host adapter 15(n) to perform a retrieval operation, in which the host adapter 15(n) initiates retrieval of computer programs and digital data (generally, "information") from the digital data storage subsystem 12 for use by the local computer 14(n) in its processing operations. In addition, the local computer 14(n) may control its associated host adapter 15(n) to perform a storage operation in which the host adapter 15(n) initiates storage of processed data in the digital data storage subsystem 12. Generally, retrieval operations and storage operations in connection with the digital data storage subsystem 12 will collectively be referred to as "access operations."

In connection with both retrieval and storage operations, the host adapter 11(n) will transfer access operation command information, together with processed data to be stored during a storage operation, over the bus 13, and a bus access control logic circuit 18 is provided to arbitrate among devices connected to the bus, including the host adapters 15(n), which require access to the bus 13. In controlling access to the bus 13, the bus access control logic circuit 18 may use any of a number of known bus access arbitration techniques, including centralized bus access control techniques in which bus access is controlled by one device connected to bus 13, as well as distributed arbitration techniques in which bus access control logic circuitry is distributed among the devices which require access to the bus. In addition, the digital computer system 10 includes a system manager console 19 which permits a system manager to control various elements of the system 10 in a conventional manner. It will be appreciated that, although the system manager console 19 is shown in FIG. 1 as a separate element, any of the local computers 14(n) may provide the functionality of the console 19, in which case a separate element need not be provided.

The digital data storage subsystem 12 in one embodiment is generally similar to the digital data storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). As shown in FIG. 1, the digital data storage subsystem 12 includes a plurality of digital data stores 20(1) through 20(M) (generally identified by reference numeral 20(m)), each of which is also connected to bus 13. Each of the data stores 20(m) stores information, including programs and data, which may be accessed by the host computers 11(n) as well as processed data provided to the digital data storage subsystem 12 by the host computers 11(n).

Each data store 20(m), in turn, includes a storage controller 21(m) and one or more storage devices generally identified by reference numeral 22. The storage devices 22 may comprise any of the conventional magnetic disk and tape storage devices, as well as optical disk storage devices and CD-ROM devices from which information may be retrieved. Each storage controller 21(m) connects to bus 13 and controls the storage of information which it receives thereover in the storage devices connected thereto. In addition, each storage controller 21(m) controls the retrieval of information from the storage devices 22 which are connected thereto for transmission over bus 13. As with the host adapters 15(n) access of bus 13, the bus access control logic circuit 18 also controls access by the storage controllers to the bus 13.

The digital data storage subsystem 12 also includes a common memory subsystem 30 for caching information during an access operation and event status information providing selected status information concerning the status of the host computers 11(n) and the data stores 20(m) at certain points in their operations. The caching of event status information by the common memory subsystem 30 is described in detail in U.S. patent application Ser. No. 08/532,240 filed Sep. 22, 1995, in the name of Eli Shagam, et al., and entitled Digital Computer System Including Common Event Log For Logging Event Information Generated By A Plurality of Devices (Atty. Docket No. 95-034) assigned to the assignee of the present invention and incorporated herein by reference. The information cached by the common memory subsystem 30 during an access operation includes data provided by a host computer 11(n) to be stored on a data store 20(m) during a storage operation, as well as data provided by a data store 20(m) to be retrieved by a host computer 11(n) during a retrieval operation. The common memory subsystem 30 effectively operates as a buffer to buffer information transferred between the host computers and the data stores 20(m) during an access operation.

The common memory subsystem 30 includes a cache memory 31, a cache index directory 32 and a cache manager 33, which are generally described in U.S. patent application Ser. No. 07/893,509 filed Jun. 4, 1992, now U.S. Pat. No. 5,381,539, in the name of Moshe Yanai, et al., entitled "System And Method For Dynamically Controlling Cache Management," and U.S. patent application Ser. No. 08/523, 304, now U.S. Pat. No. 5,592,432, filed Sep. 5, 1995, in the name of Natan Vishlitzky et al. and Cache Management System Using Time Stamping for Replacement Queue (Atty. Docket No. 95-032) hereinafter referred to as the "Vishlitzky application"), both of which are assigned to the assignee of the present invention and incorporated herein by reference. The cache memory 31 operates as a buffer in connection with storage and retrieval operations, in particular buffering data received from the host computers 11(n) to be transferred to the storage devices for storage, and buffering data received from the data stores 20(m) to be transferred to the host computers 11(n) for processing.

Figure 2:
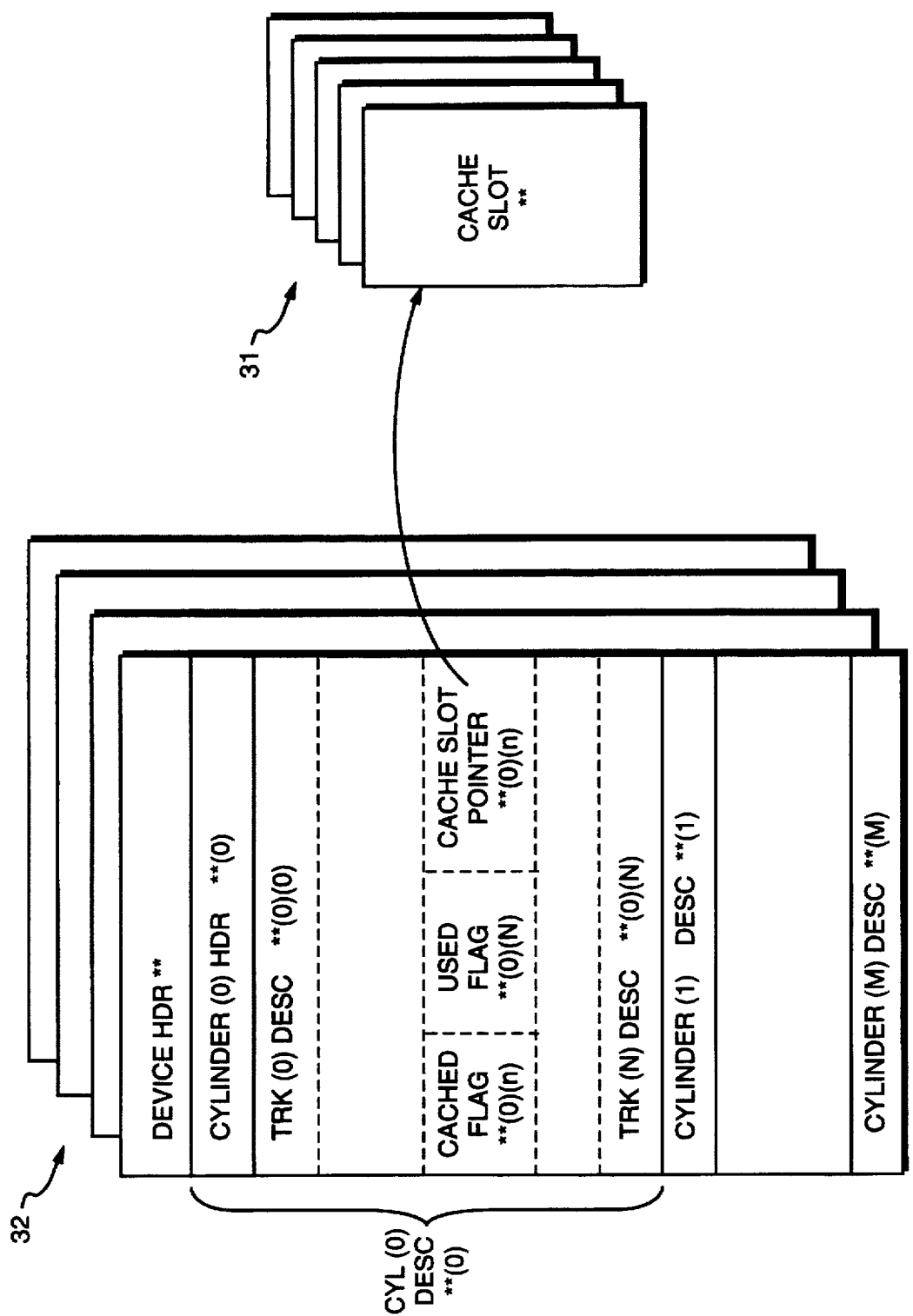
FIG. 2 depicts the organization of a cache memory and cache index directory useful in understanding the operation of the storage subsystem depicted in FIG. 1.

The cache memory 31 and cache index directory 32 will generally be described in connection with FIG. 2. With reference to FIG. 2, the cache memory 31 includes a series of storage locations, which are organized in a series of cache slots 31(0) through 31(S) (generally identified by reference numeral 31(s)). The storage locations are, in turn, identified by a series of addresses, with the starting address of a cache slot being identified by a base address. The cache slots 31(s), in turn, operate as the cache memory's buffer as described above.

The cache index directory 32 operates as an index for the cache slots 31(s) in the cache memory 31. The cache index directory 32 includes a plurality of cache index tables 32(0) through 32(D) (generally identified by reference numeral 32(d)), each of which is associated with one of the storage devices 22 in the storage subsystem 12. Each cache index table 32(d) includes a device header field 34, which provides, for example, selected identification and status information for the device 22 associated with the cache index table 32(d). In addition, each cache index table 32(d) includes a plurality of cylinder descriptors 35(1) through 35(C) (generally identified by reference numeral 35(c)) each of which is associated with one of the cylinders in the storage device 22 that is associated with the cache index table 32(d). Each cylinder descriptor 35(c), in turn, includes a cylinder header 36(c), which provides, for example, selected identification and status information for the cylinder associated with the cylinder descriptor 35(c).

In addition, each cylinder descriptor 35(c) includes a plurality of track descriptors 35(c)(0), each of which is associated with one of the tracks in the cylinder 35(c). Each track descriptor, in turn, includes information for the associated track of the storage device 22, including whether a copy of the data stored on the track is cached in the cache memory 31, and, if so, the identification of the cache slot 31(s) in which the data is cached. In particular, each track descriptor includes a cached flag 37(c)(t) and a cache slot pointer 38. The cached flag 37(c)(t), if set, indicates that the data on the track associated with the track is cached in a cache slot 31(s), and the cache slot pointer 38 identifies the particular cache slot in which the data is cached. In addition, each track descriptor includes a used flag 39(c)(t) which may be used to indicate whether the data, after being stored in the cache slot identified by the cache slot pointer 38(c)(t), has been used by the host computer 11(n) during a retrieval operation. This "host used" flag may be used to determine whether the cache slot may be re-used for another access operation.

Each of the host adapters 15(n) and each of the device controllers 21(m) includes a cache manager 34 and 34(m), respectively, to access to the cache memory 31, cache index directory 32 and cache manager memory 33. The particular operations performed during an access operation will depend on a number of factors, including the access operation to be performed, whether or not the data from the particular track to be accessed is cached in the cache memory 31, and whether or not the data contained in a cache slot 31(s) has been modified or updated by a host adapter's cache manager 34(n) during a storage operation. As described in the aforementioned Shagam application, the host computers 11(n) typically perform storage and retrieval operations in connection with data in the cache memory 31, and the device controllers 21(m) perform "staging" and "de-staging" operations to transfer data in the storage devices 22 to the cache memory 31 for buffering (the staging operations) and to transfer data from the cache memory 31 to the storage devices 22 for storage (the de-staging operations). In performing the staging and de-staging operations, the device controllers 21(m) generally transfer data to and from the cache memory 31 in units of a track, that is, they will during a staging operation transfer all of the data in a track from a storage device 22 to a cache slot 31(s) in the cache memory 31, and during a de-staging operation copy all of the data in a slot in the cache memory 31 to the track of the storage device 22 from which it was originally staged.

The cache manager memory 33 maintains a number of work lists which are used to control operations by the host adapters 15(n) and storage controllers 21(m) during an access operation. In particular, the cache manager memory 33 includes a cache slot replacement list, a pending write list and various lists which the host adapters 15(n) and storage controllers 21(m) use to communicate to coordinate staging operations (not shown). It will be appreciated that the various lists maintained by the cache manager memory 33 may comprise any of a number of convenient forms, including queues, trees, stacks or the like. The cache slot replacement list is used to control re-use of cache slots during staging operations in accordance with a convenient cache-slot re-use methodology. During a staging operation, the storage controller's cache manager 34(m) uses the cache slot replacement list to select a cache slot 31(s) into which it will load the data retrieved from a storage device. (The aforementioned Vishlitzky application describes a modified least-recently-used cache-slot re-use methodology used in one embodiment of the invention). The pending write list is used to identify cache slots 31(s) which contain updated data, which has not been written to a storage device. During de-staging operations, the storage controllers' cache managers 34(m) will use the write pending list to identify cache slots to be written to a storage device 22. Preferably, the cache slots 31(s) which are identified in the pending write list will not also be listed in the cache slot replacement list, so that cache slots 31(s) which contain updated data will not be used until the data has not been written to a storage device through a de-staging operation.

The staging operation coordination communication lists include a plurality of stage request lists and a plurality of stage completion lists, with one stage request list being associated with each data store 20(m) and one stage completion list being associated with each host computer 11(n). The host computers' cache managers 34(m) use the stage request lists to store stage requests to be performed by the respective data stores 20(m), and the data stores' cache managers 35(n) use the stage completion lists to store stage completion messages to indicate to the respective host computers' cache managers 34(m) that the stage requests have been completed.

Generally, a host computer 11(n), during a retrieval operation, attempts to retrieve the data from the cache memory 31. However, if the data is not in the cache memory 31, it will enable the device controller 21(m) which controls the storage device 22 that contains the data to be retrieved to "stage" the track which contains the data to be retrieved, that is, to transfer all of the data in the track which contains the data to be retrieved into a slot in the cache memory 31. After the data to be retrieved is in a slot in the cache memory 31, the host computer 11(n) will retrieve the data from the slot. Similarly, during a storage operation, the host computer 11(n) will determine whether the particular track into which the data is to be written is in a slot in the cache memory 31 and if so will store the data in the slot. However, if the data is not in the cache memory 31, the host computer 11(n) will enable the cache manager 35(m) and storage controller 21(m) which controls the storage device 22 that contains the track whose data is to be updated to perform a staging operation in connection with the track, thereby to transfer the data in the track into a slot in the cache memory 31. After the data from the track has been copied into the cache memory 31, the host computer 11(n) will update the data in the track.

The storage controller 21(m) generally attempts to perform a staging operation in connection with an empty slot in the cache memory 31. However, if the storage controller 21(m) may find that all of the cache slots in the cache memory 31 are filled, it will in any case select one of the slots to be used with the staging operation. Before transferring the data from the track to the selected cache slot, it will determine whether the data in the slot has been updated by a storage operation, and if so copy the data to the storage device 22 in a de-staging operation, and thereafter perform a staging operation to copy the data from the storage device to the selected cache slot. It will be appreciated that the storage controller 21(m) need only perform a de-staging operation in connection with a cache slot if the data in the cache slot has been updated, since if the data in the cache slot not been updated before the slot is re-used (which may occur if the a host computer 11(n) has only performed retrieval operations therewith), the data in the cache slot corresponds to the data in the storage device 22.

More specifically, as described in the aforementioned Vishlitzky application, during a retrieval operation, the cache manager 34(n) of the initiating host adapter 15(n) will initially access the cache index table 32(d) in the cache index directory 32 associated with the storage device 22 in which the data to be retrieved is stored, in particular accessing the track descriptor 36(c)(t) of the cylinder descriptor 36(c) to determine, from the condition of the cached flag 37(c)(t), whether the data from the track is cached in a cache slot 31(s) in the cache memory. If the cached flag 37(c)(t) indicates that data from the track is cached in a cache slot 31(s), the cache manager 34(n) uses the cache slot pointer 38 to identify the particular cache slot 31(s) in which the data is cached and retrieves the required data from the cache slot 31(s).

On the other hand, if the cache manager 34(n) determines from the cached flag 36(c)(t) that the data from the track is not cached in a cache slot 31(s), it will generate a stage request to enable the storage controller 21(m) for the storage device 22 which maintains the data to be retrieved, load the stage request in the stage request queue for the data store 21(m) and notify the storage controller 21(m) that a stage request had been loaded in the stage request queue. At some point after receiving the notification, the storage controller 21(m) will retrieve the stage request and perform a staging operation in response thereto. In performing the staging operation, the storage controller 21(m) will retrieve the data from the requested track, use the above-described cache slot replacement list to select a cache slot 31(s), load the data into cache slot 31(s) and update the track descriptor 36(c)(t) in the cache index table 32(d) associated with the storage device 22 to indicate that the data from the track is in the cache slot 31(s), in particular setting the cached flag 37(c)(t) and loading a pointer to the cache slot in the cache slot pointer 38(c)(t).

After the storage controller 21(m) has completed the staging operation, it will load a staging completed message in the stage completion list in the cache manager memory 33 associated with the host computer 11(n) which issued the staging request, and notify the host computer's cache manager 34(n) that a stage completed message has been loaded therein. At some point after receiving the notification, the host computer's cache manager 34(n) can repeat the operations performed in connection with the retrieval request as described above, in particular accessing the cache index table 32(d) in the cache index directory 32 associated with the storage device 22 in which the data to be retrieved is stored, in particular accessing the track descriptor 36 of the cylinder descriptor 36(c) to determine, from the condition of the cached flag 37 whether the data from the track is cached in a cache slot 31(s) in the cache memory and, if so, use the cache slot pointer 38(t) to identify the particular cache slot 31(s) in which the data is cached and retrieve the required data from the cache slot 31(s). Since at this point the cached flag 37 should indicate that the data from the track is cached in a cache slot 31(s), the cache manager 34(n) should be able to complete the retrieval operation.

Similar operations occur during a storage operation, in which data in a particular track is updated, with the additional operation of removing the identification of the cache slot 31(s) containing data to be updated from the replacement list and loading it into the pending write list. During a storage operation, the cache manager 34(n) of the initiating host adapter 15(n) will initially access the cache index table 32(d) in the cache index directory 32 associated with the storage device 22 in which the data to be updated is stored, in particular accessing the track descriptor 36 of the cylinder descriptor 36(c) to determine, from the condition of the cached flag 37 whether the data from the track is cached in a cache slot 31(s) in the cache memory. If the cached flag 37 indicates that data from the track is cached in a cache slot 31(s), the cache manager 34(n) uses the cache slot pointer 38(t) to identify the particular cache slot 31(s) in which the data is cached and loads the update data into the cache slot 31(s). In addition, the host adapter's cache manager 34(n) will remove the identification of the selected cache slot 31(s) from the replacement list to the pending write list so that the cache slot 31(s) will not be re-used until a de-staging operation has been performed in connection with the cache slot 31(s).

On the other hand, if the cache manager 34(n) determines from the cached flag 36 that the data from the track is not cached in a cache slot 31(s), it will generate a stage request to enable the storage controller 21(m) for the storage device 22 which maintains the data to be retrieved, load the stage request in the stage request queue for the data store 21(m) and notify the storage controller 21(m) that a stage request had been loaded in the stage request queue. At some point after receiving the notification, the storage controller 21(m) will retrieve the stage request and perform a staging operation in response thereto. In performing the staging operation, the storage controller 21(m) will retrieve the data from the requested track, select a cache slot 31(s), load the data into cache slot 31(s) and update the track descriptor 36 in the cache index table 32(d) associated with the storage device 22 to indicate that the data from the track is in the cache slot 31(s), in particular setting the cached flag 37 and loading a pointer to the cache slot in the cache slot pointer 38.

After the storage controller 21(m) has completed the staging operation, it will load a staging completed message in the stage completion queue in the cache manager memory 33 associated with the host computer 11(n) which issued the staging request, and notify the cache manager 34(n) that a stage completed message has been loaded therein. At some point after receiving the notification, the cache manager 34(n) can repeat the operations performed in connection with the retrieval request as described above, in particular accessing the cache index table 32(d) in the cache index directory 32 associated with the storage device 22 in which the data to be retrieved is stored, in particular accessing the track descriptor 36 of the cylinder descriptor 36(c) to determine, from the condition of the cached flag 37 whether the data from the track is cached in a cache slot 31(s) in the cache memory and, if so, use the cache slot pointer 38(t) to identify the particular cache slot 31(s) in which the data is cached and retrieve the required data from the cache slog 31(s). Since at this point the cached flag 37 should indicate that the data from the track is cached in a cache slot 31(s), the cache manager 34(n) should be able to complete the storage operation as described above.

As described above, the data stores' cache managers 35(m) also perform de-staging operations using the pending write list to identify cache slots 31(s) which contain updated data to be written back to the original storage device 22 and track whose data was cached in the respective cache slots 31(s). When a cache slot 31(s) is de-staged, since at that point the data in the cache slot 31(s) corresponds to the data on the respective storage device 22, the data store's cache manager 35(m) which performs the de-staging operation will remove the cache slot's identification from the pending write list and return it to the replacement list so that the cache slot 31(s) can be removed. It will be appreciated, however, that a host computer's cache manager 34(n) may perform a number of retrieval operations and/or storage operations in connection with data in the same cache slot 31(s) after the data in the track cached in the slot has been staged and before it can be de-staged, and so data in a cache slot 31(s) can be updated a number of times before it is de-staged. In addition, it will be appreciated that after a cache slot 31(s) has been de-staged, it may also be updated during a storage operation before the cache slot 31(s) is re-used during a staging operation. When that occurs however, since, as described above, the host computer's cache manager 34(m) removes the cache slot's identification from the replacement list and placed it on the write pending list as part of the storage operation, the cache slot 31(s) will be subject to another de-staging operation before it can be re-used. Thus, a particular cache slot 31(s) may be subject to de-staging a number of times with data cached for the same storage device 22, cylinder and track, without being reused.

One aspect of the invention is directed to the format of the information stored in the cache memory 31 by the data store's cache manager 34(m) during a staging operation. The information to be stored on and retrieved from tracks on the storage devices 22 is in the form of one or more records, with each record being in well-known "CKD" ("count-key-data") format, in which various records may be of differing sizes. On the other hand, the storage devices 22 provide, for each track, a "fixed block" storage architecture in which each track comprises a predetermined number of blocks, with each block being capable of storing a predetermined amount of data. It will be appreciated that, since the CKD records are of variable size, some records may be smaller than a block, but other records may be larger than a block. For a CKD record that is smaller than a block, that record may be stored in a single block on a storage device 22. However, for a CKD record that is larger than a block, a number of blocks will be required to store the record, and, preferably, such a record will be stored on successive blocks of the same track. If a record does not completely fill a disk block, padding will be provided from the end of a record to the end of the unfilled disk block. Accordingly, if a CKD record to be stored on a storage device 22 is smaller than the device's block, padding will be added so that the record, with the padding, will completely fill the block. Similarly, if a CKD record to be stored is larger than the device's block, padding will be added so that the record, with the padding, will completely fill an integral number of successive blocks. It will be appreciated that, if a CKD record has a size corresponding to the size of an integral number of block(s) (that is, the CKD record's size corresponds to the size of one or more blocks), the CKD record will completely fill the block(s) in which it is to be stored and so no padding will be needed.

Figure 3:
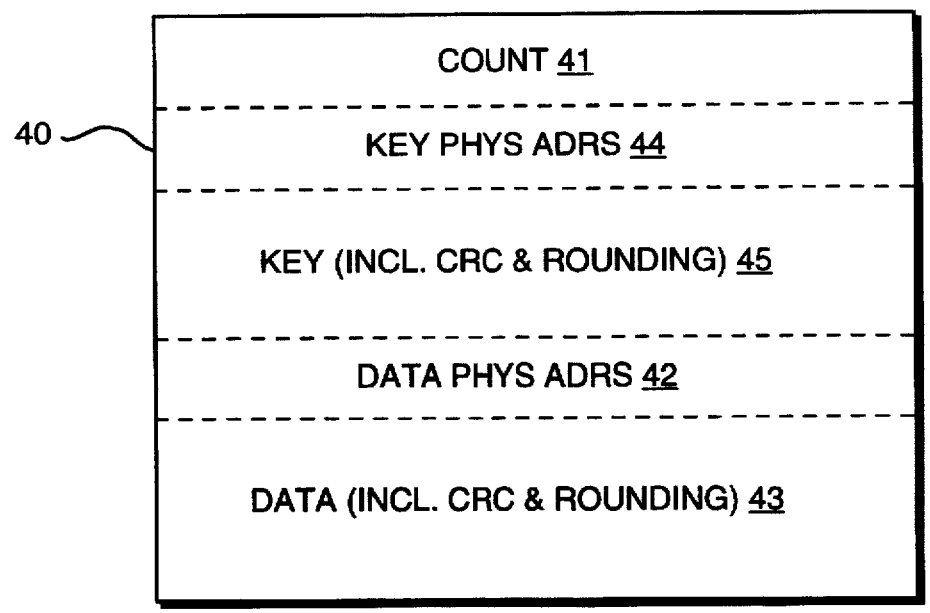
FIGS. 3 through 5 depict several data structures which are useful in the storage subsystem depicted in FIG. 1, useful in understanding one aspect of the invention.
Figure 4:
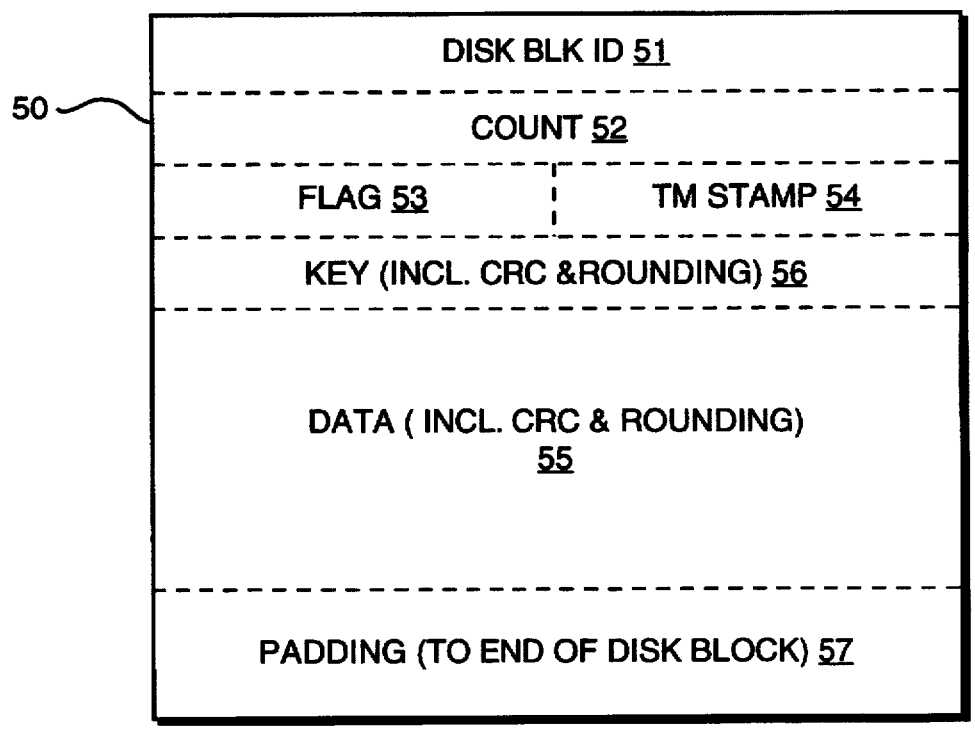
Figure 5:
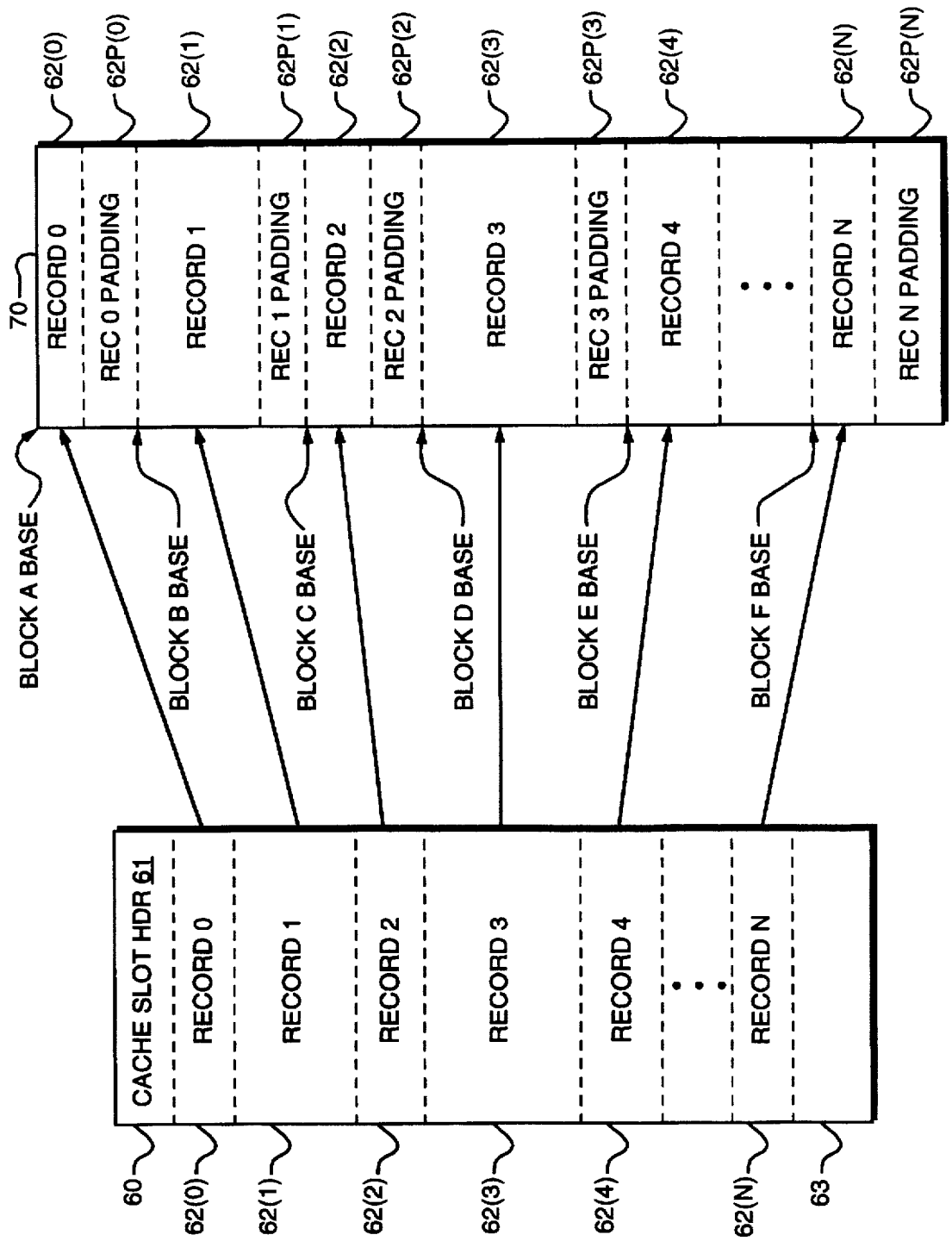

As noted above, the invention is directed to the format of the information stored in the cache memory 31 by the data store's cache manager 34(m) during a staging operation. The invention will be described in connection with FIGS. 3 through 11, with FIGS. 3 through 7 being directed to one embodiment of the invention, and FIGS. 8 and 11 being directed to a second embodiment of the invention. With respect initially to FIGS. 3 through 5, FIG. 3 depicts a cached record data structure 40 depicting the format of an illustrative record as stored in a cache slot in the cache memory 31, FIG. 4 depicts the organization of a stored record data structure 50 depicting the format of the same record as stored on the storage device 22, and FIG. 5 depicts the relationship between the record or records stored in a cache slot and the same record or records as stored on a track on the storage device 22. With reference to FIG. 3, cached record data structure 40 includes a plurality of fields, including a count field 41, a data physical address field 42 and a data field 43. The count field 41 stores the count value of the CKD-formatted information. Similarly, the data field 43 stores the data of the CKD-formatted information. The data physical address field 42 stores a value identifying the physical address of the data in the storage device 22, the physical address value identifying the device 22, the disk surface and the location on the disk of the beginning of the information stored in the data field 43 of the cached record data structure 40. The data field 43 includes error detection information, which, in one embodiment, is in the form of conventional "CRC" ("cyclical redundancy check") information. In addition, in one embodiment, the fields of cached record data structure 40 of the records stored in the various cache slots of the cache memory 31 are organized in words each having a predetermined size, which, in one embodiment, corresponds to eight bytes. In that embodiment, the count field 41 and data physical address field 42 both comprise one eight-byte word, and the data field 43 includes, in addition to the information and CRC information, rounding padding so that the data field 43 comprises an integral number of eight-byte words.

In the CKD format, the "key" information is optional; if the "key" information is present the cached record data structure 40 also includes a key physical address field 44 and a key information field 45, both of which are located between the count field 41 and the data physical address field 42. If the record includes "key" information, the key information field 45 stores the key information of the CKD-formatted information and the key physical address field 44 stores a value identifying the physical address of the key information in the storage device 22, the physical address value identifying the device 22, the disk surface and the location on the disk of the beginning of the information stored in the key information field 45 of the cached record data structure 40. In addition, in the aforementioned embodiment in which the various fields of a fields of cached record data structure 40 of the records stored in the various cache slots of the cache memory 31 are organized in eight-byte words, the key physical address field 44 will comprise one eight-byte word, and the key field 45 includes, in addition to the key information and CRC information, rounding padding so that the data field 43 comprises an integral number of eight-byte words.

As noted above, FIG. 4 depicts the organization of a stored record data structure 50 depicting the format of a record as stored on the storage device 22. With reference to FIG. 4, the stored record data structure 50 comprises a number of fields, including a disk block identifier field 51, a count field 52, a flags field 53, a time stamp field 54, and a data file 55. If the cached record data structure 40 included a key field 45, the stored record data structure 50 will also include a key field 56 which is located ahead of the data field 55. The disk block identifier field 51 contains a identifier value of the first of the successive block(s) on the track on which the record is stored. The count field 52 receives count information from count field 41 of the cached record data structure 40 during a storage operation, and provides count information for storage in the count field 41 of the cached record data structure 40 during a retrieval operation. Similarly, the data field 55 receives data from data field 43 of the cached record data structure 40 during a storage operation, and provides data for storage in the data field 43 of the cached record data structure 40 during a retrieval operation, and, the key field 56, if present, receives key information from key field 45 of the cached record data structure 40 during a storage operation, and provides key information for storage in the key field 45 of the cached record data structure 40 during a retrieval operation. In addition, if the size of the record in the stored record data structure 50 is not an integral number of blocks on the storage device 22, a padding field 57 will be provided to ensure that the record will be stored on an integral number of blocks as described above.

As noted above, FIG. 5 depicts the relationship between the record or records stored in a cache slot 31(s) in the cache memory 31 and the same record or records as stored on a track 70 on a storage device 22. With reference to FIG. 5, cache slot 31(s) is shown which stores a cache slot header 61 and a plurality of records 62(0) through 62(N) (generally identified by reference numeral 62). The cache slot header 61 may contain such information as an identifier for the storage device 22 and track for which the contents of the cache slot 31(s) are a cache copy, as well as descriptors for the various records 62(n) in the cache slot 31(s), for example identifying the location in the cache slot 31(s) at which each record begins and the length of each record.

The records 62(n) contain the information, in the form of a series of the cached record data structures 40 described above in connection with FIG. 3, and the cache slot header 61 includes information that identifies the cache slot and the particular storage device 22 and track on which the information contained in the records 62(n) are to be written. Each cache slot in the cache memory 31, such as cache slot 60, provides sufficient space to buffer all of the records 62(n) for a complete track on the storage devices 22, as well as to store the cache slot header 61. Accordingly, a cache slot 31(s) may have unused space, identified by reference numeral 63 in FIG. 5, if the total amount of space required for the records 62(n) is less than the storage capacity of a track in a storage device 22.

With further reference to FIG. 5, as noted above, the storage devices 22 store data on the tracks in a "fixed block" storage architecture, and so the track 70 comprises a series of equal-sized disk blocks. The successive records 62(n) in the cache slot 31(s) is a cache copy of the successive records from the track 70. On the track 70, each record 62(n) occupies one or more disk blocks. The data for each record 62(n) begins at the beginning of a disk block of the track 70. If data comprising a record does not fully occupy an integral number of disk blocks (that is, one or more disk blocks), padding is provided in the last disk block which contains data in the record, to the end of a disk block, so that the data in the next record will begin at the beginning of the next disk block. Thus, for example, the first record 62(0) in the cache slot 31(s) is shown as beginning at the base, or beginning, of a disk block identified by reference numeral "A," which will be the first disk block on the track. Since the data in the record 62(0) does not fill an integral number of disk blocks, padding will be added, identified by reference numeral 62P(0), which extends from the end of the data from record 62(1) to the end of the last disk block which contains data from record 62(1).

Similarly, the second record 62(1) in the cache slot 32(s) is shown as beginning at the base of a disk block identified by reference numeral "B." Disk block B may be the next disk block after disk block A (if the record 62(0) comprises an amount of data that is less than or equal to the amount of data which can be stored in a disk block), or it may be several disk blocks after disk block A (if the record 62(0) comprises an amount of data that is more than the amount of data which can be stored in a disk block), but in any case the data comprising second record 62(1) will be stored in the track 70 beginning at the base of block B. In addition, if the data in record 62(1) does not fill an integral number of disk blocks, padding 62P(1) will be added to fill the last disk block which contains data in record 61(1) extending from the end of the data to the end of the last disk block which contains data from record 62(1). The remaining records 62(2) through 62(N) are stored similarly on the track 70, with each record beginning at the base of a respective disk block "C," "D," . . . , N, with padding appended at the end of the data for each record if the data does not fill an integral number of disk blocks.

Figure 6:
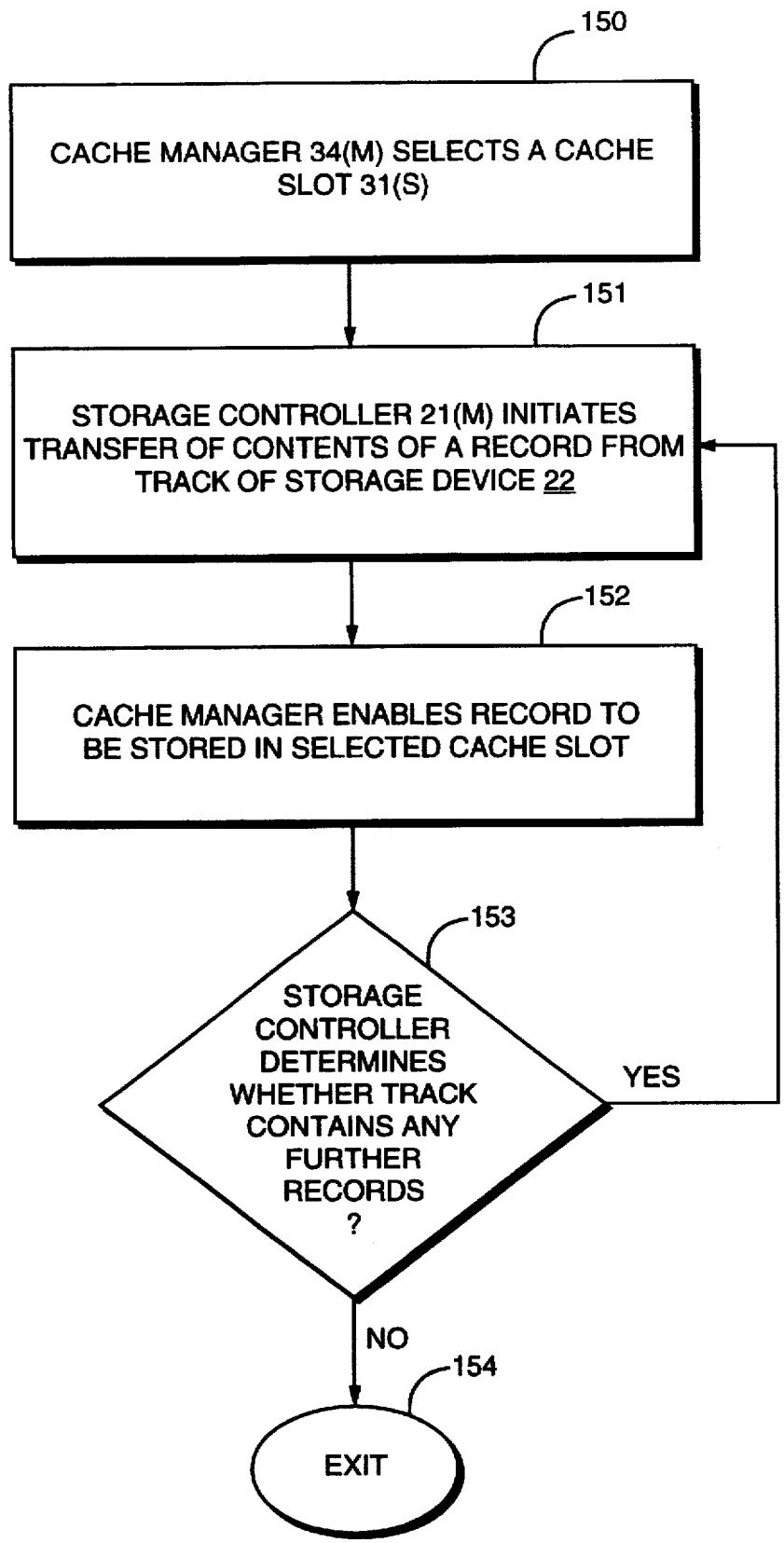
FIGS. 6 and 7 are flow charts depicting operations performed by the storage subsystem in connection with transferring data to and from storage devices in connection with the aspect described in connection with FIGS. 3 through 5.
Figure 7:
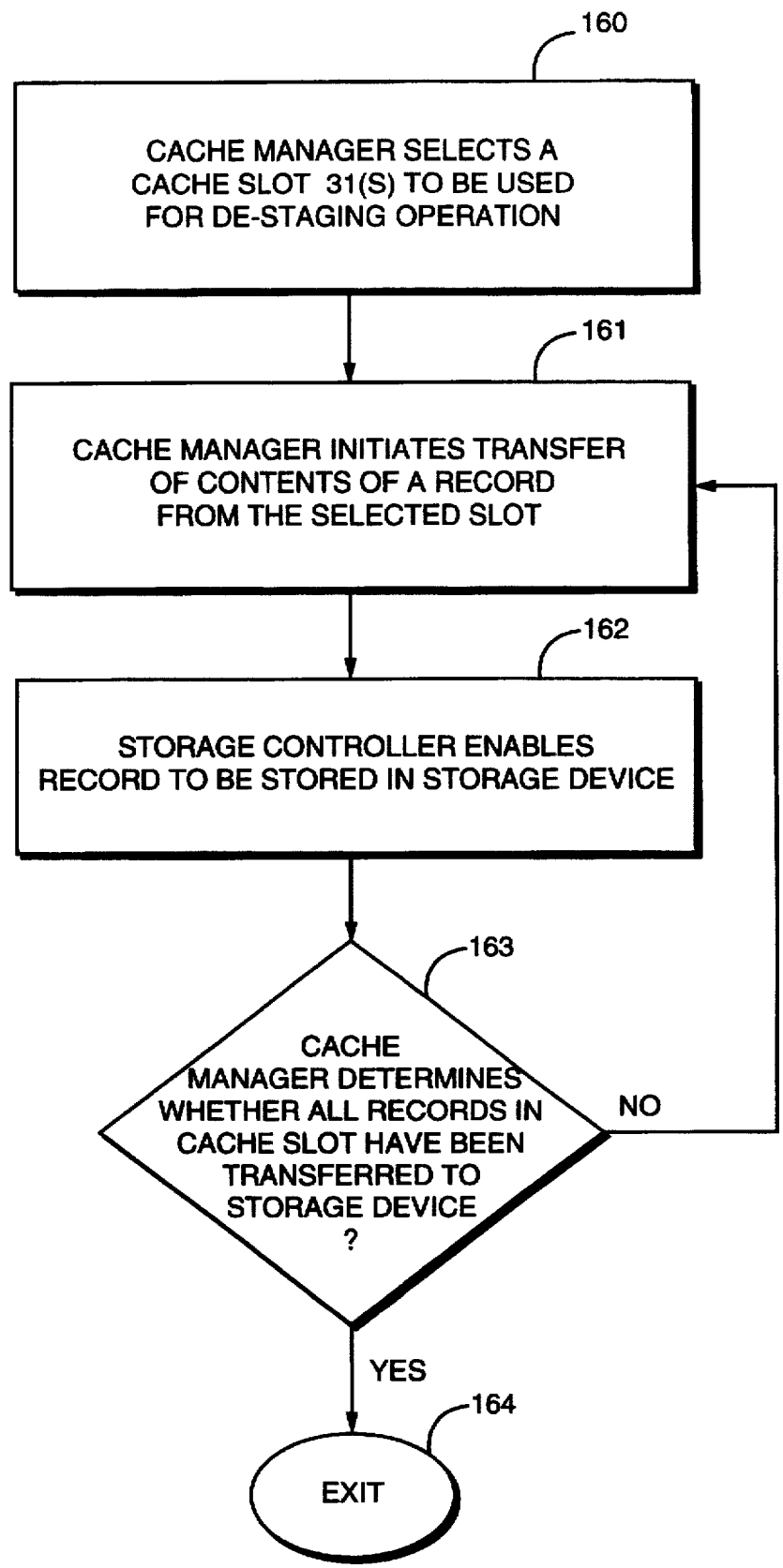

The operations performed by the cache manager 34(m) and associated storage controller 21(m) in transferring information between the track 70 of a storage device 22 and a cache slot 60 during a staging operation and a de-staging operation will be generally described in connection with the flow charts in FIGS. 6 and 7, respectively. With reference to FIG. 6, during a staging operation, in which the cache manager 34(m) and associated storage controller 21(m) transfer data from a track in a storage device 22 to a cache slot 31(s), the cache manager 34(m) will select a cache slot 31(s) in the cache memory 31 into which the contents of the track 70 are to be loaded (step 150). Thereafter, the storage controller 21(m) will initiate a transfer of the contents of the first record 62(0) from the track (step 151), and the cache manager 34(m) will enable the record to be stored as record 62(0) in the cache slot 60 (step 152). Thereafter, the storage controller 21(m) will determine whether the track contains any further records (step 153). If the storage controller 21(m) makes a positive determination in step 153, it will return to step 151 to initiate a transfer of the next record 62(1) from the track. The cache controller 21(m) and cache manager 34(m) will perform steps 151 through 153 through a number of iterations, in each iteration transferring data from one of the records in the track 70 to successive locations in the cache slot 60, until all of the records in the track 70 have been transferred. At that point, the cache controller 21(m) will make a negative determination in step 153, and exit (step 154).

The cache controller 21(m) and cache manager 34(m) perform similar operations in connection with a de-staging operation, during which records are transferred from the cache slot 60 in the cache memory 31 to track 70 in a storage device 22. Initially, the cache manager 34(m) uses the above-described write pending list to identify a cache slot 60 to be used for a de-staging operation (step 160, FIG. 7). Thereafter, the cache manager 34(m) will initiate a transfer of the contents of the first record 62(0) from the slot (step 161), and the storage controller 21(m) will enable the record to be stored as record 62(0) in the track 70 (step 162). Thereafter, the cache manager 34(m) will determine whether all of the records in the track have been transferred (step 163). If the cache manager 34(m) makes a positive determination in step 163, it will return to step 161 to initiate a transfer of the next record 62(1) from the cache slot 60. The cache controller 21(m) and cache manager 34(m) will perform steps 161 through 163 through a number of iterations, in each iteration transferring data from one of the successive records in the cache slot 60 to the respective blocks of track 70, until all of the records in the cache slot 60 have been transferred. At that point, the cache manager 34(m) will make a positive determination in step 163, and exit (step 164).

It will be appreciated from FIGS. 3 through 5 that, while there are a number of similarities between the structure of the information in the cache slot 31(s) and the structure of the information as stored on the track 70, there are also a number of differences. Significant similarities include the that the cache slot 31(s) stores all of the records on the track 70 and in the same order as on the track, both of which are beneficial during staging and de-staging operations. One problem arises, however, in that, since each record will begin on a separate disk block, when transferring a track from the storage device 22 to the cache slot 31(s) and from the cache slot 31(s) to the storage device 22 will be performed in a separate transfer operation.

Figure 8:
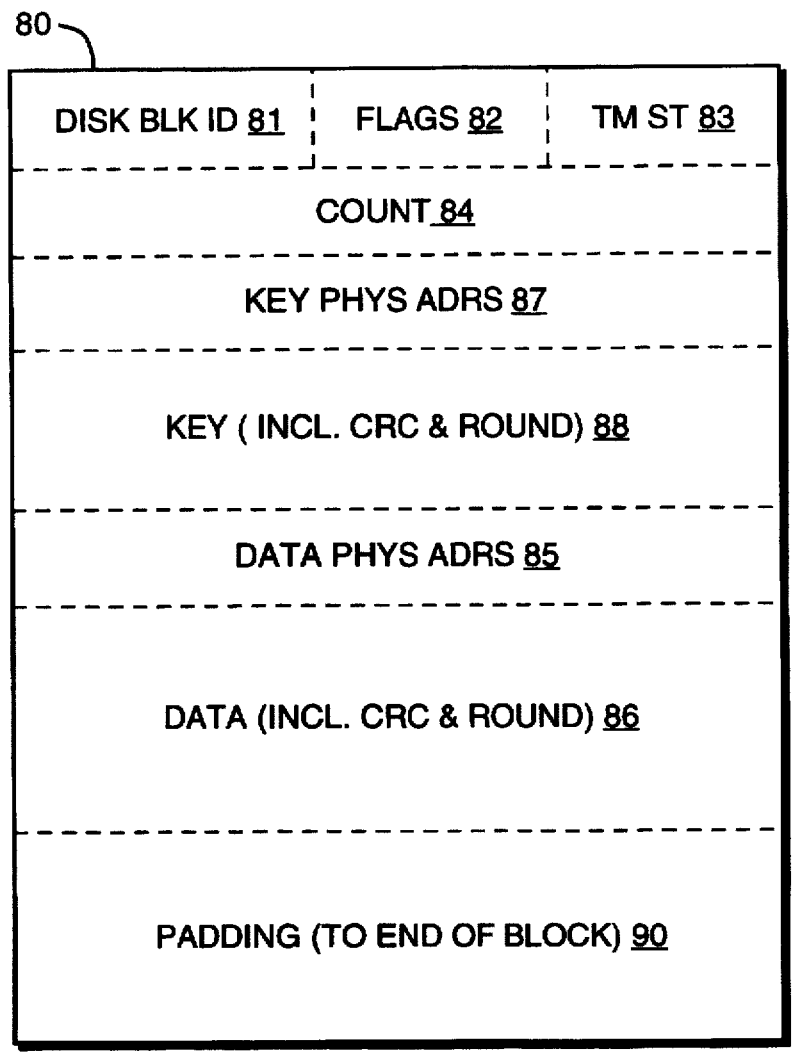
FIGS. 8 and 9 depict several data structures which are useful in the storage subsystem depicted in FIG. 1, useful in understanding a second aspect of the invention.
Figure 9:
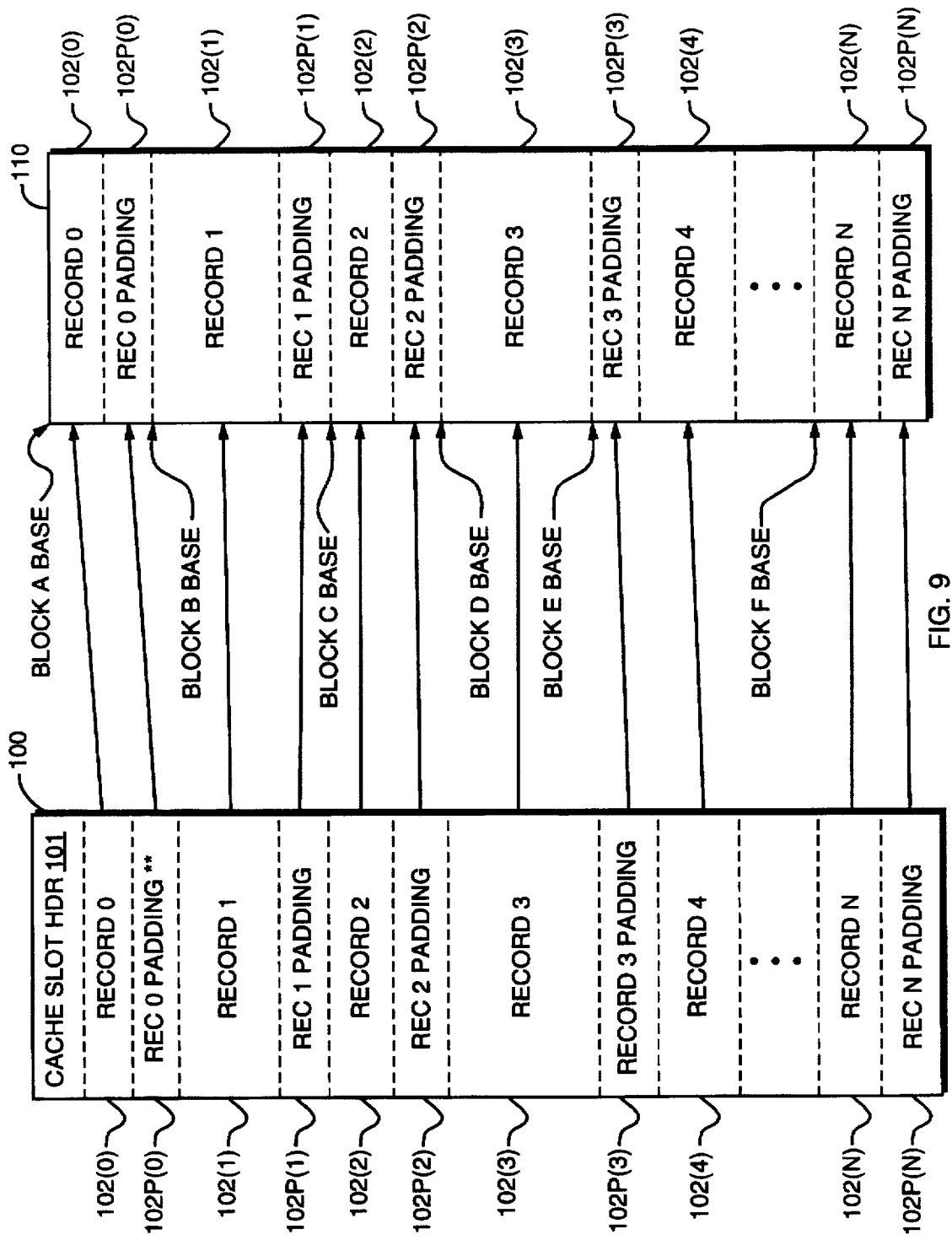

The second embodiment, depicted in FIGS. 8 and 9, avoids the requirement that each record be transferred between the cache slot 31(s) and storage device 22 in separate transfer operations, and instead provides that records from an entire track can be transferred to a cache slot 31(s) in a single transfer operation during a staging operation, and that the contents of the entire cache slot 31(s) can be transferred to the storage device 22 in a single transfer operation during a de-staging operation.

With reference initially to FIG. 8, that figure depicts the organization of a record data structure 80 depicting the format for storing a CKD record in the cache slot 31(s) and the storage device 22. As shown in FIG. 8, the record data structure 80 comprises a number of fields, including a disk block identifier field 81, a flags field 82, a time stamp field 83, a count field 84, a data physical address field 85 and a data file 86. If the CKD record also includes a key field (as described above, the key field of a CKD record is optional), the record data structure 80 will also include a key field key 88 and a key physical address field 87.

The disk block identifier field 81 contains a identifier value of the first of the successive block(s) on the track on which the record is stored. The count field 84 contains the count information of the CKD formatted record, and the data field 86 contains the data portion of the CKD formatted record. The data field 86 also includes error detection information, which, in one embodiment, is in the form of conventional "CRC" ("cyclical redundancy check") information. The data physical address field 85 contains an address identifying the location of the beginning of the data field 86 in the storage device 22, in particular identifying the storage device 22, cylinder, track, block and offset into the block of the beginning of the data field 86.

If the CKD formatted record includes key information, the key field 88 contains the key information, along with error includes error detection information, which, in one embodiment, is in the form of conventional "CRC" ("cyclical redundancy check") information. In addition, the key physical address field 87 contains an address identifying the location of the beginning of the key field 86 in the storage device 22, in particular identifying the storage device 22, cylinder, track, block and offset into the block of the beginning of the key field 88.

As in the embodiment depicted in FIGS. 3 through 5, the fields of record data structure 80 of are organized in words each having a predetermined size, which, in one embodiment, corresponds to eight bytes. In that embodiment, the disk block identifier field, flags field 82 and time stamp field together comprise a single eight-byte word. In addition, the count field 84, key physical address field 87 and data physical address field 85 each comprise one eight-byte word. In addition, the data field 86 includes, in addition to the information and CRC information, rounding padding so that the data field 86 will comprise an integral number of eight-byte words.

In addition, if the number of data words containing fields 81 through 88 does not correspond to an integral number of disk blocks, the record 80 will also include a padding field 90, which contains the padding to the end of the disk block.

FIG. 9 depicts the relationship between the record or records stored in a cache slot 100 (which corresponds to a cache slot 31(s) in the cache memory 31) with the format depicted in FIG. 8, and the same record or records as stored on a track 110. As in the cache slot 60 depicted in FIG. 5, cache slot 100 includes a cache slot header 101 and a plurality of records 102(0) through 102(N) (generally identified by reference numeral 102). The cache slot header 101 may contain such information as an identifier for the storage device 22 and track for which the contents of the cache slot 100 are a cache copy, as well as descriptors for the various records 102(n) in the cache slot 100, for example identifying the location in the cache slot 31(s) at which each record begins and the length of each record.

The records 102(n) contain the information, in the form of a series of the cached record data structures 80 described above in connection with FIG. 8, and the cache slot header 101 includes information that identifies the cache slot and the particular storage device 22 and track on which the information contained in the records 102(n) are to be written. Each cache slot in the cache memory 31, such as cache slot 100, provides sufficient space to buffer all of the records 102(n) for a complete track on the storage devices 22, as well as to store the cache slot header 101, including the padding fields 90. Accordingly, the cache slot 100 will not have unused space (other than the padding field that is associated with each record 80.

With further reference to FIG. 9, as noted above, the storage devices 22 store data on the tracks in a "fixed block" storage architecture, and so the track 110 comprises a series of equal-sized disk blocks. The successive records 102(n) in the cache slot 100 is a cache copy of the successive records from the track 110. On the track 100, each record 102(n) occupies one or more disk blocks. The data for each record 102(n) begins at the beginning of a disk block of the track 110. If the data comprising a record (that is, the contents of the record in fields 81 through 88) does not fully occupy an integral number of disk blocks (that is, one or more disk blocks), padding is provided in the last disk block which contains data in the record, to the end of a disk block, so that the data in the next record will begin at the beginning of the next disk block, which padding will correspond to the padding in field 90 of the record when stored in the cache slot 100. Thus, for example, the first record 102(0) in the cache slot 100 is shown as beginning at the base, or beginning, of a disk block identified by reference numeral "A," which will be the first disk block on the track. Since the data in the record 102(0) does not fill an integral number of disk blocks, padding will be provided, identified by reference numeral 102P(0), which extends from the end of the data from record 102(1) to the end of the last disk block which contains data from record 102(1). The padding 102P (0) corresponds to the padding for field 90 in the record 102(0) as contained in the cache slot 100.

Similarly, the second record 102(1) in the cache slot 100 is shown as beginning at the base of a disk block identified by reference numeral "B." Disk block B may be the next disk block after disk block A (if the record 102(0) comprises an amount of data that is less than or equal to the amount of data which can be stored in a disk block), or it may be several disk blocks after disk block A (if the record 102(0) comprises an amount of data that is more than the amount of data which can be stored in a disk block), but in any case the data comprising second record 102(1) will be stored in the track 110 beginning at the base of block B. In addition, if the data in record 102(1) does not fill an integral number of disk blocks, padding 102P(1), which corresponds to padding field 90 of the record, will be provided to fill the last disk block which contains data in record 101(1) extending from the end of the data to the end of the last disk block which contains data from record 102(1). The remaining records 102(2) through 102(N) are stored similarly on the track 70, with each record beginning at the base of a respective disk block "C," "D," ..., M, with padding at the end of the data for each record if the data does not fill an integral number of disk blocks.

It will be appreciated from FIGS. 8 and 9 that, since the formats of the sequence of records 62(n), including the padding fields 90, is the same as between a track 110 and the cache slot 100 in which the track is to be cached, transferring a track 110 from the storage device 22 to the cache slot 100 and from the cache slot 31(s) to the storage device 22 will be performed in a single transfer operation, which will simplify transferring the data between the track 110 and the cache slot 100.

Figure 10:
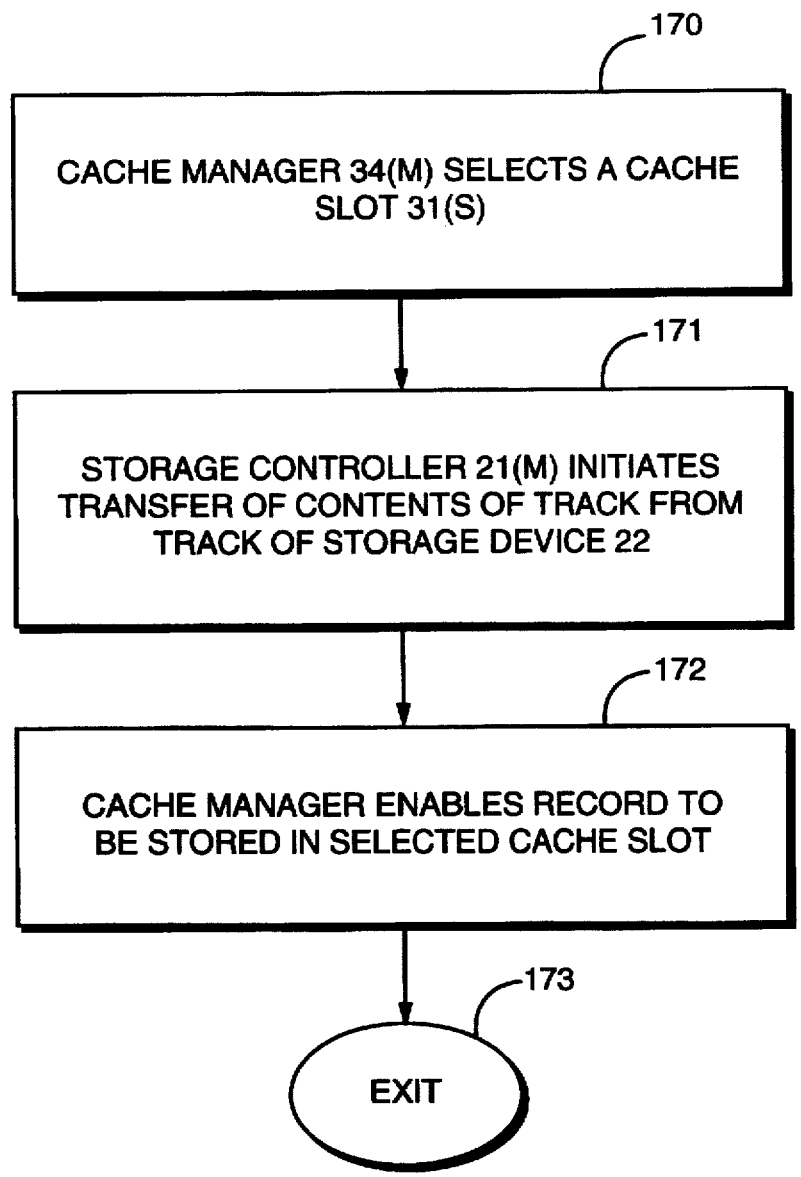
FIGS. 10 and 11 are flow charts depicting operations performed by the storage subsystem in connection with transferring data to and from storage devices in connection with the aspect described in connection with FIGS. 8 and 9.
Figure 11:
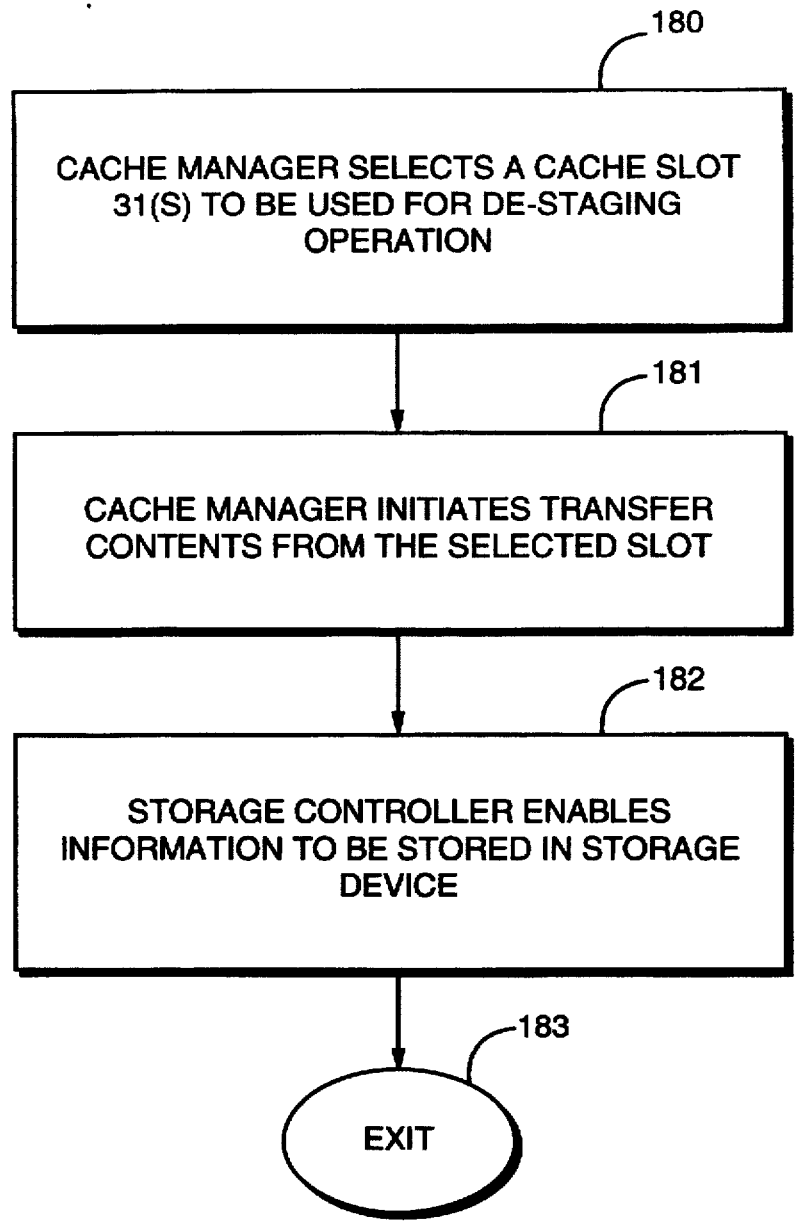

The operations performed by the cache manager 34(m) and associated storage controller 21(m) in transferring information between the track 110 of a storage device 22 and a cache slot 100 during a staging operation and a de-staging operation will be generally described in connection with the flow charts in FIGS. 10 and 11, respectively. With reference to FIG. 10, during a staging operation, in which the cache manager 34(m) and associated storage controller 21(m) transfer data from a track in a storage device 22 to a cache slot 31(s), the cache manager 34(m) will select a cache slot 31(s) in the cache memory 31 into which the contents of the track 110 are to be loaded (step 170). Thereafter, the storage controller 21(m) will initiate a transfer of the contents of the entire track (step 171), and the cache manager 34(m) will enable the track to be stored in the cache slot 100 (step 172). Thereafter, the storage controller 21(m) and cache manager 34(m) will exit (step 173).

The cache controller 21(m) and cache manager 34(m) perform similar operations in connection with a de-staging operation, during which records are transferred from the cache slot 100 in the cache memory 31 to track 110 in a storage device 22. Initially, the cache manager 34(m) uses the above-described write pending list to identify a cache slot 60 to be used for a de-staging operation (step 180, FIG. 11). Thereafter, the cache manager 34(m) will initiate a transfer of the contents of the entire cache slot 100, except the cache slot header 101 from the slot (step 181), and the storage controller 21(m) will enable the transferred contents to be stored on the track 110 (step 182). Thereafter, the storage controller 21(m) and cache manager 34(m) will exit (step 183).

Although the invention has been described in connection with a digital computer system 10 in which each host computer 11(n) includes a local computer 14(n), with each local computer being associated with a host adapter 15(n), it will be appreciated that each host adapter 15(n) may connect to a plurality of local computers over, for example, a conventional computer network connection (not shown). In such an embodiment, the host adapter 15(n) may receive and process storage subsystem access requests from any of local computers which are connected to the network, substantially as described above in connection with FIG. 1. In addition, it will be appreciated that a computer network may have connected thereto a plurality of host adapters 15(n) which may separately receive and process storage subsystem access requests from the local computers over the network connection.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by letters patent of the United States is:

1. A digital data storage subsystem for storing data for use by a digital data utilization device, the data as used by the digital data utilization device being organized in the form of variable-length records, the digital data storage subsystem including:

A. a digital data storage device having at least one fixed block storage unit having a plurality of tracks, each of said plurality of tracks including a plurality of records, each of said plurality of records configured to store a predetermined amount of data, said storage unit operable for storing at each of said tracks, data and additional padding if said data does not comprise at least said predetermined amount of data;

B. a cache including at least one cache slot configured for storing data corresponding to one of said plurality of tracks;

C. a cache control for controlling the transfer of data from said fixed block storage unit to said at least one cache slot for use by said digital data utilization device, and in addition for controlling the transfer of data from said at least one cache slot to said fixed block storage unit, said cache control for controlling the transfer so that the format of the data in said fixed block storage unit conforms to the format of the data in said at least one cache slot.

2. The digital data storage subsystem of claim 1 wherein said format of the data in said at least one cache slot is a fixed block data format.

* * * * *

UNITED STATES PATENT AND TRADEMARK OFFICE
CERTIFICATE OF CORRECTION

PATENT NO. : 5,802,557
DATED : September 1, 1998
INVENTOR(S) : Natan Vishlitzky, Yuval Ofek, and Haim Kopylovitz It is certified that error appears in the above-identified patent and that said Letters Patent are hereby corrected as shown below:

Assignee: EMC Corporation, Hopkinton, MA 01748

Signed and Sealed this

Tenth Day of April, 2001

Attest:

NICHOLAS P. GODICI

*Attesting Officer*      *Acting Director of the United States Patent and Trademark Office*